United States Patent
Pham et al.

(10) Patent No.: US 8,241,382 B2
(45) Date of Patent: Aug. 14, 2012

(54) AIR CLEANER FOR MOTOR VEHICLES OPERATING IN EXTREME WEATHER CONDITIONS

(75) Inventors: Thanh Pham, Canton, MI (US); Joseph Matthew McCann, Plymouth, MI (US); Giriraj Srinivasan, Troy, MI (US); Roger Khami, Troy, MI (US); Michael Marvin Landgraf, Huntington Woods, MI (US); Thomas Eric Svenson, Novi, MI (US); William C. Ronzi, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 372 days.

(21) Appl. No.: 12/622,332

(22) Filed: Nov. 19, 2009

(65) Prior Publication Data

US 2011/0023813 A1    Feb. 3, 2011

Related U.S. Application Data

(60) Provisional application No. 61/230,522, filed on Jul. 31, 2009.

(51) Int. Cl.
*B01D 46/00* (2006.01)

(52) U.S. Cl. ......... 55/484; 55/309; 55/310; 55/385.3; 55/419; 55/502; 55/503; 55/DIG. 31; 123/198 E (58) Field of Classification Search .......... 55/309, 55/310, 385.3, 419, 484, 502, 503, 483, DIG. 31; 123/198 E See application file for complete search history.

(56) References Cited

U.S. PATENT DOCUMENTS

| | | | |
|---|---|---|---|
| 4,861,359 A * | 8/1989 | Tettman | 55/419 |
| 5,391,212 A * | 2/1995 | Ernst et al. | 55/385.3 |
| 5,556,441 A * | 9/1996 | Courtwright et al. | 55/502 |
| 7,393,372 B2 | 7/2008 | Cassell et al. | |
| 7,442,221 B2 * | 10/2008 | Ruhland et al. | 55/497 |
| 7,637,976 B2 * | 12/2009 | Dirnberger et al. | 55/385.3 |
| 2011/0023427 A1 * | 2/2011 | Srinivasan et al. | 55/385.3 |

OTHER PUBLICATIONS

Srinivasan, Giriraj et al., "Air Cleaner Filter Assembly for Motor Vehicles Operating in Extreme Weather Conditions," U.S. Appl. No. 12/622,337, filed Nov. 19, 2009, 25 pages.

* cited by examiner

*Primary Examiner* — Robert Clemente
(74) *Attorney, Agent, or Firm* — Julia Voutyras; Alleman Hall McCoy Russell & Tuttle LLP (57) ABSTRACT

A motor-vehicle air cleaner comprises the filter assembly, an air-cleaner housing configured to fittably and removably accommodate the filter assembly and to enclose the main filter and the auxiliary filter separately when the filter assembly is accommodated in the air-cleaner housing. The motor-vehicle air cleaner further comprises a flow restrictor configured to restrict air flow to the auxiliary filter.

19 Claims, 6 Drawing Sheets

AIR CLEANER FOR MOTOR VEHICLES OPERATING IN EXTREME WEATHER CONDITIONS

CROSS-REFERENCE TO RELATED APPLICATION

This application claims priority to U.S. Provisional Application 61/230,522, filed on Jul. 31, 2009 and entitled FRESH AIR SUPPLY FOR MOTOR VEHICLES OPERATING IN EXTREME WEATHER CONDITIONS, the entirety of which is hereby incorporated by reference herein for all purposes.

TECHNICAL FIELD

The present application relates to the field of motor vehicle engineering, and more particularly, to providing adequate air flow to a motor-vehicle engine system under conditions of heavy snow or dust.

BACKGROUND AND SUMMARY

The internal combustion engine of a motor vehicle requires an adequate supply of filtered, fresh air. Accordingly, air from the atmosphere may be drawn through a particle filter to remove dust and other particulates en route to the engine intake. Under normal operating conditions of the motor vehicle—normal weather, a normal operating environment, etc., a single particle filter may provide many months of trouble-free air filtration before a replacement is needed. During extreme weather conditions, however, the filter may clog prematurely, thereby restricting air flow into the engine and degrading motor-vehicle performance. Such extreme weather conditions may include very snowy or dusty conditions, for example.

One solution to the problem noted above is to install a specialized grille cover on the motor vehicle to prevent entry of snow and/or dust into the engine compartment. However, such a grille cover may be expensive and must be matched particularly to the front-end configuration of the motor vehicle on which it is installed. Further, the motor-vehicle operator may be obliged to install and remove the grille cover repeatedly, in response to changing weather conditions, causing dissatisfaction. The inventors herein have recognized these limitations and have devised an alternative, or additional, approach aimed at providing fresh air to the engine of a motor vehicle operating in extreme weather conditions.

Therefore, one embodiment provides a motor-vehicle air cleaner adapted to provide clean intake air. The motor-vehicle air cleaner comprises a filter assembly including a main filter, an auxiliary filter set apart from the main filter, and a filter mount fixed to and configured to support the main filter and the auxiliary filter. The motor-vehicle air cleaner further comprises an air-cleaner housing configured to fittably and removably accommodate the filter assembly and to enclose the main filter and the auxiliary filter separately when the filter assembly is accommodated in the air-cleaner housing. The motor-vehicle air cleaner further comprises a flow restrictor configured to restrict air flow to the auxiliary filter.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

The subject matter of the present disclosure is now described by way of example and with reference to certain illustrated embodiments. Components that may be substantially the same in one or more embodiments are identified coordinately and are described with minimal repetition. It will be noted, however, that components identified coordinately in different embodiments of the present disclosure may be at least partly different. It will be noted that some of the figures included in this disclosure are schematic, and are identified as such. In the schematic figures, views of the illustrated embodiments are generally not drawn to scale; aspect ratios, feature size, and numbers of features may be purposely distorted to make selected features or relationships easier to see. Other figures included in this disclosure are based on photographic images or computer models of the various embodiments. The figures identified as such are rendered to scale.

Figure 1:
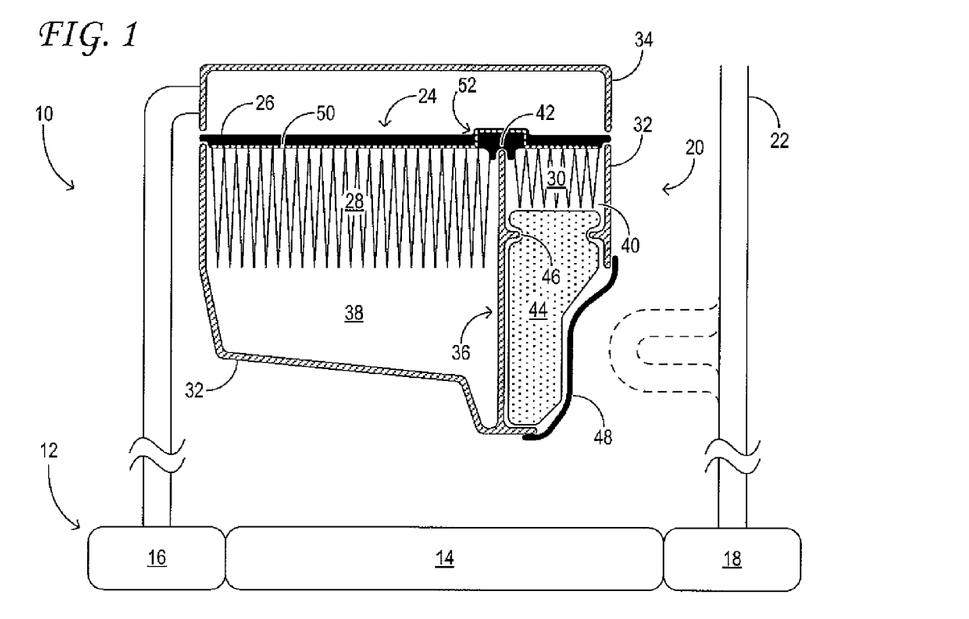
FIG. 1 schematically shows aspects of a system for providing clean intake air to a motor-vehicle engine during snowy or dusty conditions, in accordance with an embodiment of the present disclosure.

FIG. 1 schematically shows aspects of an example system 10 for providing clean intake air to a motor-vehicle engine. The illustrated system is specially configured to resist clogging and to provide the intake air during snowy or dusty conditions, but may be used during normal ambient conditions as well. Further, the system may be used in virtually any motor-vehicle application where reduced flow restriction, increased filter capacity, and reduced noise/vibration in the air intake system are desired.

System 10 includes engine 12, in which combustion chambers 14 are coupled to intake manifold 16 and to exhaust manifold 18. In the combustion chambers, combustion may be initiated and sustained via spark ignition and/or compression ignition in any variant. The engine may be configured to consume any of a variety of fuels: gasoline, alcohols, diesel, biodiesel, compressed natural gas, hydrogen, etc. The fuel may be supplied to the combustion chambers via direct injection, port injection, or any combination thereof.

System 10 is configured to supply air to engine 12. Air enters the system via air cleaner 20 and flows through various downstream air-handling components before entering intake manifold 16. Such components (not shown in the drawings) may include a compressor, a charge-air intercooler, and/or a throttle, for example. Engine exhaust released from exhaust manifold 18 may flow through various downstream exhaust-system components before entering exhaust conduit 22. Such components (not shown in the drawings) may include one or more exhaust-aftertreatment devices—nitrogen-oxide reducing catalysts, hydrocarbon-oxidizing catalysts, soot filters, and the like. From exhaust conduit 22, the engine exhaust may flow to other exhaust-system components—one or more additional exhaust-aftertreatment devices, a silencer, etc.—before being discharged to the atmosphere.

Figure 2:
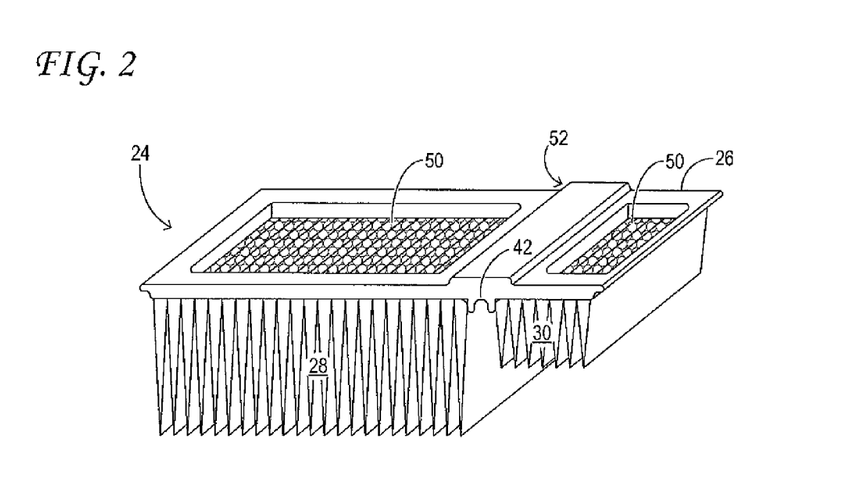
FIG. 2 schematically shows a filter assembly for a motor-vehicle air cleaner in accordance with an embodiment of the present disclosure.

Air cleaner 20 is adapted to provide clean intake air during snowy or dusty conditions. The air cleaner includes filter assembly 24, shown in greater detail in FIG. 2. The filter assembly may include two or more suitably supported filters, e.g., a main filter and an auxiliary filter set apart from each other. Accordingly, FIGS. 1 and 2 show filter mount 26 coupled to main filter 28 and auxiliary filter 30. The filter mount is fixed to and configured to support the main filter and the auxiliary filter while allowing air to flow through the filters. In the embodiment shown in FIGS. 1 and 2, the filter mount has an open, frame-like structure from which the main and auxiliary filters are suspended from above. The main and auxiliary filters may be coupled to the filter mount by molding the filter mount around the filters, or with the aid of an adhesive, or in any other suitable manner. In the illustrated embodiment, the filter mount frames two open areas: a first open area located over the main filter and a second open area located over the auxiliary filter. The open areas allow air to pass through the filter mount. In other embodiments, there may be more than two filters, and filter mount may frame more than two open areas.

Main filter 28 and auxiliary filter 30 may be substantially the same or at least partly different. In the embodiment shown in FIGS. 1 and 2, the main and auxiliary filters are both pleat-pack filters, but the main filter is taller and longer than the auxiliary filter. In other embodiments, other kinds of filters may be used. Further, the main filter may be longer than, wider than, and/or taller than the auxiliary filter in the various embodiments of the present disclosure. In one embodiment, the main filter may be 90 millimeters in height, and the auxiliary filter may be 50 millimeters in height.

In the embodiment shown in FIG. 1, a significant pressure differential may develop across filter assembly 24 when engine 12 is running. Specifically, the inlet side of the filter assembly may experience barometric pressure, while the outlet side may experience manifold or turbocharger-inlet vacuum. During conditions when main filter 28 is clogged with snow or dust, the pressure differential may be greater still as a result of decreased air flow. Therefore, to minimize the risk that unbalanced stresses may deform the pleat packs of the main and/or auxiliary filters, the filter assembly may include a rigid mesh disposed between the main and auxiliary filters and the filter mount, and extending at least over the open areas thereof. Accordingly FIG. 2 shows rigid mesh 50 arranged in this manner. For added stability, the rigid mesh may be embossed to form a ridge projecting opposite the main and auxiliary filters, and the ridge may be inserted in a receiving nook of the filter mount. FIG. 1 provides a cross-sectional view of this feature, with rigid mesh 50 inserted in receiving nook 52. In some embodiments, the main and/or auxiliary filter may be further reinforced by applying one or more adhesive strips to the side opposite the rigid mesh.

Figure 3:
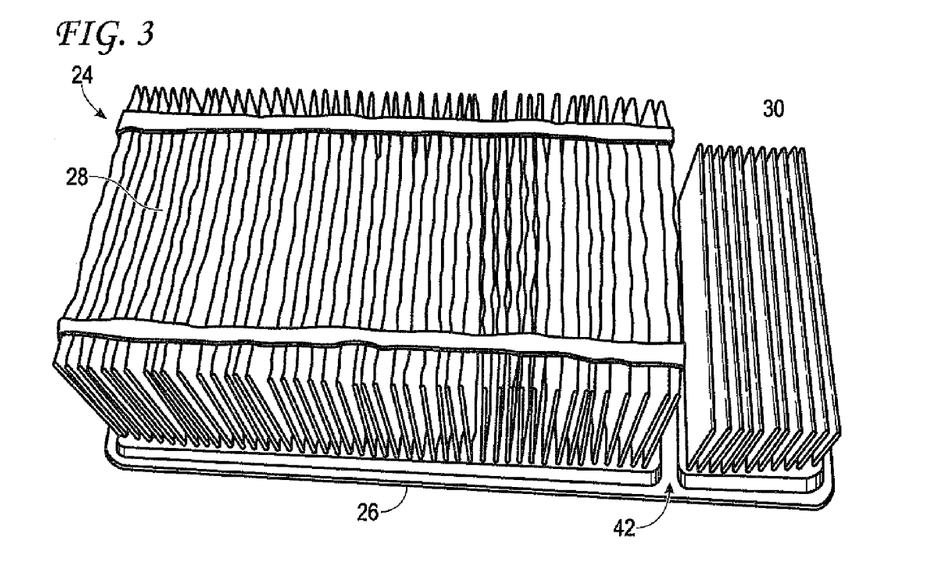
FIGS. 3-5 show a series of views of a filter assembly for a motor-vehicle air cleaner in accordance with an embodiment of the present disclosure.
Figure 4:
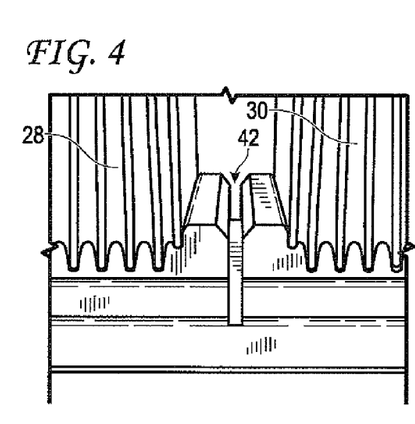
Figure 5:
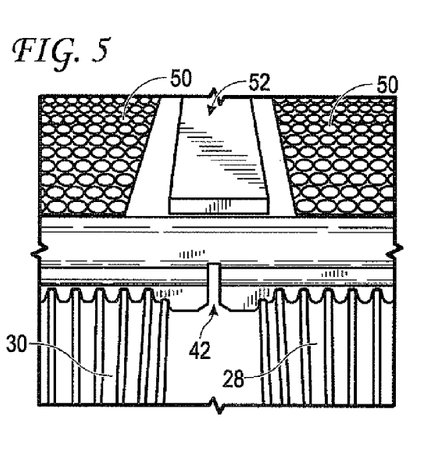

FIGS. 3-5 show a series of views of filter assembly 24 in another embodiment. The dimensions of the filter assembly shown in these drawings are accurate to the scale of the embodiment. FIG. 3 shows filter mount 26, main filter 28, auxiliary filter 30, and sealing groove 42. FIGS. 4 and 5 show close-up views of sealing groove 42, rigid mesh 50, and receiving nook 52.

Returning now to FIG. 1, air cleaner 20 includes an air-cleaner housing configured to fittably and removably accommodate the filter assembly and to enclose the main filter and the auxiliary filter separately when the filter assembly is accommodated therein. In the illustrated embodiment, the air-cleaner housing comprises housing body 32 and a housing cover 34. The housing body may be any suitable structure configured to house main filter 28, auxiliary filter 30, and other air cleaner components, as indicated below. Further, the housing body is configured to admit air to the main and auxiliary filters. Accordingly, the housing body may have at least a partly open structure, with ribbing provided in at least some of the remaining closed, solid areas for added mechanical strength.

Housing cover 34 may be sealably coupled to at least one of the housing body and the filter assembly, and configured to receive air flow from the main filter and the auxiliary filter. In the embodiment shown in FIG. 1, the housing cover is sealably coupled to the housing body and to filter mount 26. The housing cover may be secured to the housing body in any suitable manner—via a series of two-part clamps arranged in registry around the peripheries of the housing body and housing cover, for example. The housing cover is fluidically coupled to intake manifold 16 via suitable air-handling components. As a result, the air space enclosed by the filter assembly and the housing cover may, when the engine is running, be maintained at the partial vacuum of the intake manifold or turbocharger inlet. Accordingly, atmospheric air from the interior of the housing body is drawn through the main and auxiliary filters and into the air space enclosed by the filter assembly and the housing cover.

Filter mount 26 is configured to sealably couple to housing body 32. For example, the edge of the filter mount may rest on a receiving flange constructed in the housing body. Resilient materials on the receiving flange and/or the filter mount may provide a tight seal between these parts when the filter mount is compressed against the housing body—via housing cover 34, for example.

In the various embodiments of the present disclosure, air cleaner 20 may be configured to substantially prevent air flow between main filter 28 and auxiliary filter 30. To this end, filter assembly 24 may comprise a first sealing element, and the air-cleaner housing may comprise a second sealing element, complementary to the first sealing element. The first and second sealing elements may form a seal passing between the main filter and the auxiliary filter. Accordingly, in the embodiment shown in FIG. 1, housing body 32 includes dividing wall 36, which divides the air space inside the housing body into a main compartment 38 surrounding the main filter and an auxiliary compartment 40 surrounding the auxiliary filter. Filter mount 26 includes sealing groove 42, which is positioned between the main filter and the auxiliary filter and configured to receive and sealably couple to the dividing wall. In one embodiment, the sealing groove comprises a resilient material (e.g., a polyurethane) and is appropriately sized so that receipt of the dividing wall in the sealing groove forms a substantially air-tight seal dividing the main filter from the auxiliary filter. In the illustrated embodiment, the sealing element extends from one edge of the filter mount to the opposite edge of the filter mount, i.e., across an entire width of the filter mount. In one embodiment, the sealing groove may be 13 millimeters in width and 13 millimeters in height.

Figure 6:
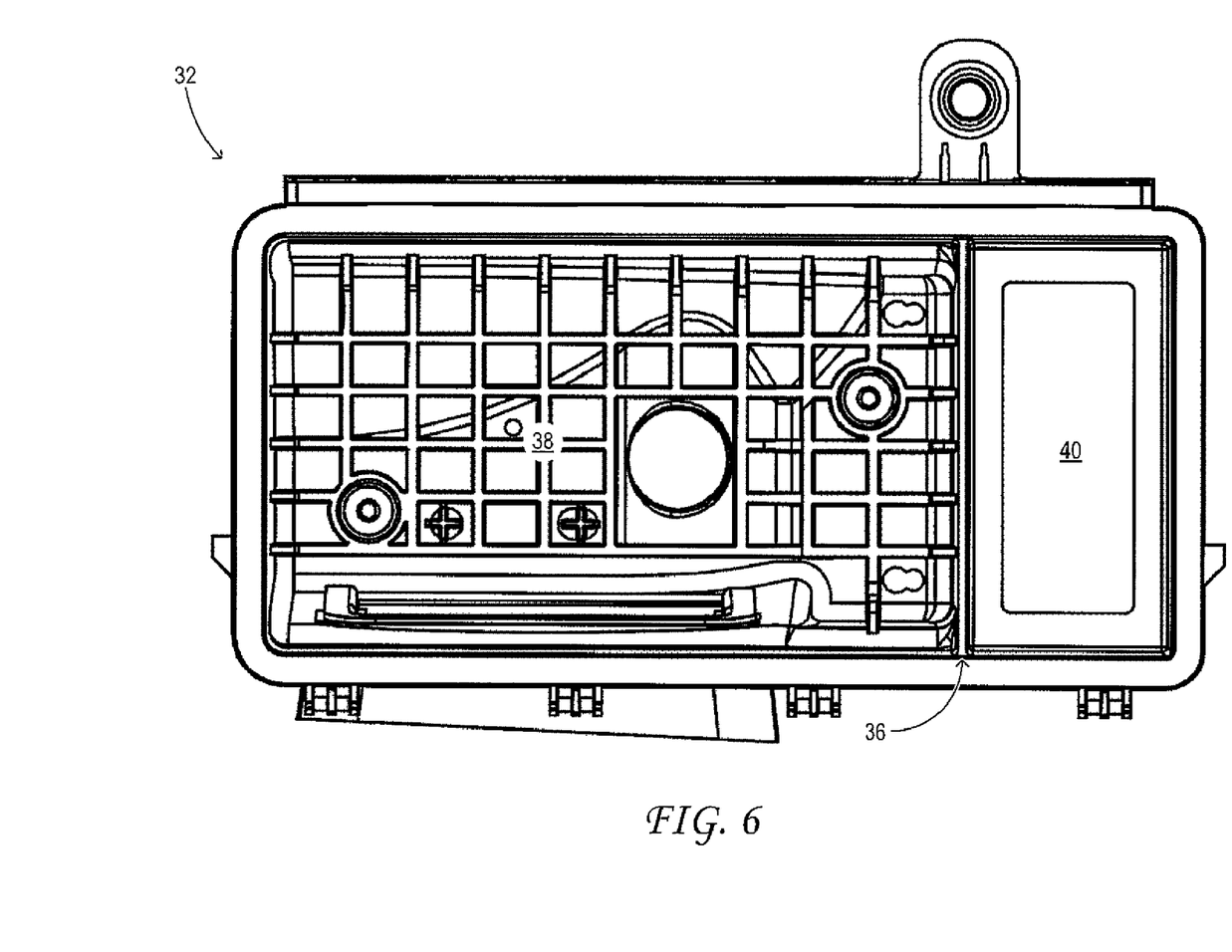
FIG. 6 shows a perspective view of a housing body of a motor-vehicle air cleaner in accordance with an embodiment of the present disclosure.

FIG. 6 shows a perspective view of housing body 32 in another embodiment. The dimensions of the housing body shown in FIG. 6 are based on a model of this embodiment and are drawn to scale. The drawing shows dividing wall 36 separating main compartment 38 from auxiliary compartment 40.

In the various embodiments of the present disclosure, certain design features are enabled by enclosing main filter 28 and auxiliary filter 30 in separate compartments of air cleaner 20. In particular, the air cleaner may be configured to provide different amounts of flow restriction to the two respective filters. In the embodiments illustrated herein, the frame-like structure of the air filter housing may provide little flow restriction per se to either filter. However, the air filter housing may accommodate additional components that provide a significant flow restriction to one filter or the other. Accordingly, FIG. 1 shows flow restrictor 44 disposed below and in fluidic communication with the auxiliary filter on the inlet side, i.e., inside housing body 32. The flow restrictor is configured to partly restrict air flow to the auxiliary filter.

Flow restrictor 44 may be sized and shaped to fit the interior of housing body 32 directly below auxiliary filter 30. The flow restrictor may provide enough restriction to cause the great majority of intake air to flow through the main filter instead of the auxiliary filter as long as the main filter is substantially unclogged. However, the restriction may be small enough so that when the main filter is clogged, as could occur during extreme weather conditions, air flow is drawn through the auxiliary filter. The air flow may be sufficient to support combustion in the engine, e.g., to prevent the engine from stalling.

Because auxiliary filter 30 does not receive a significant air flow unless or until main filter 28 becomes clogged, it is unlikely for the auxiliary filter to accumulate a clogging layer of snow and/or dust, even under conditions where snow and/or dust accumulate on and clog the main air filter.

In some embodiments, flow restrictor 44 may include a plurality of macro-scale features—orifices, obstructions, screens, vanes, wadding, etc.—that restrict the air flow. In other embodiments, the flow-restricting features may be much smaller in size. For example, the flow restrictor may comprise an open-cell flow-restricting foam, in discrete, attached or unattached monoliths or as a single monolith. The pore density of the foam may range from below 40 to above 100 pores per inch (ppi). In one embodiment, the pore density of the foam may be between 40 and 100 ppi, inclusively. In embodiments where absorption of water into the flow restrictor is to be particularly avoided, foam having a pore density of 80 ppi may be used.

In the embodiment illustrated in FIG. 1, flow restrictor 44 comprises a resilient polyurethane foam monolith. The resiliency of the foam advantageously allows the flow restrictor to be inserted into a pre-formed cavity in the air-cleaner housing and be retained there by a sealing flange. Accordingly, housing body 32 comprises sealing flange 46, which frames an open region configured to allow air to flow to auxiliary filter 30. The sealing flange is configured to prevent dust and snow from migrating above the flow restrictor, e.g., between the flow restrictor and auxiliary filter 30. In one embodiment, the sealing flange may be 4 millimeters thick and 12 millimeters wide. The resilient flow restrictor is inserted into the opening and retained there by the sealing flange. In one embodiment, the flow restrictor may have a groove formed therein for receiving the sealing flange. The groove may have any suitable shape and dimensions; for example, the groove may be 3 millimeters wide and between 10 and 12 millimeters deep. In such embodiments, interference between the sealing flange and the groove may help to keep the flow restrictor in place despite motor-vehicle vibrations, dimensional changes over time, etc. In one example, one millimeter of interference created by the thickness of the sealing flange may be used.

Figure 7:
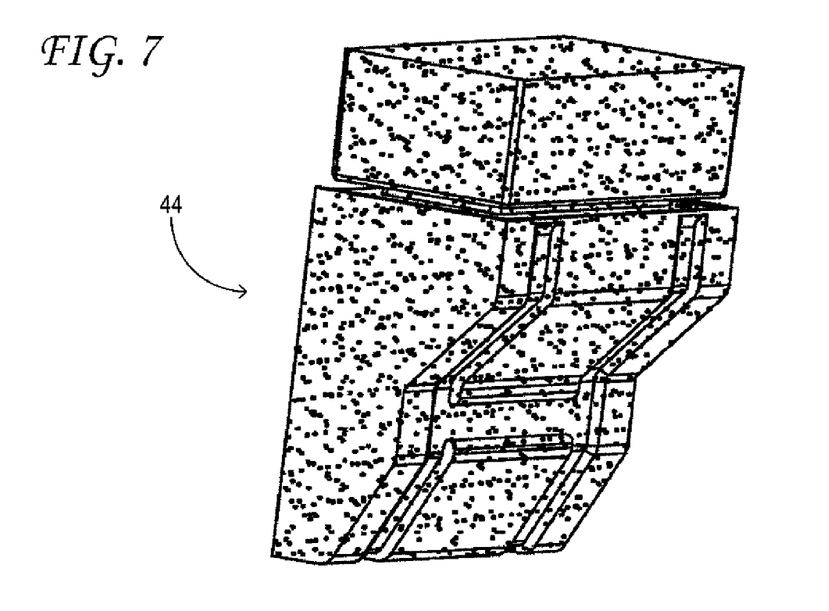
FIG. 7 shows a perspective view of a flow restrictor of a motor-vehicle air cleaner in accordance with an embodiment of the present disclosure.

FIG. 7 shows a perspective view of flow restrictor 44 in another embodiment. The dimensions of the flow restrictor shown in FIG. 7 are based on a model of this embodiment and are drawn to scale.

In some embodiments, additional measures may be taken to ensure that flow restrictor 44 remains firmly seated in the air-cleaner housing. For example, air cleaner 20 may comprise one or more bands extending from one locus of the housing body to another locus of the housing body, and configured to retain the flow restrictor in its place. Accordingly, the embodiment shown in FIG. 1 includes retaining band 48 spanning an open area of housing body 32 behind which the flow restrictor is situated.

Figure 8:
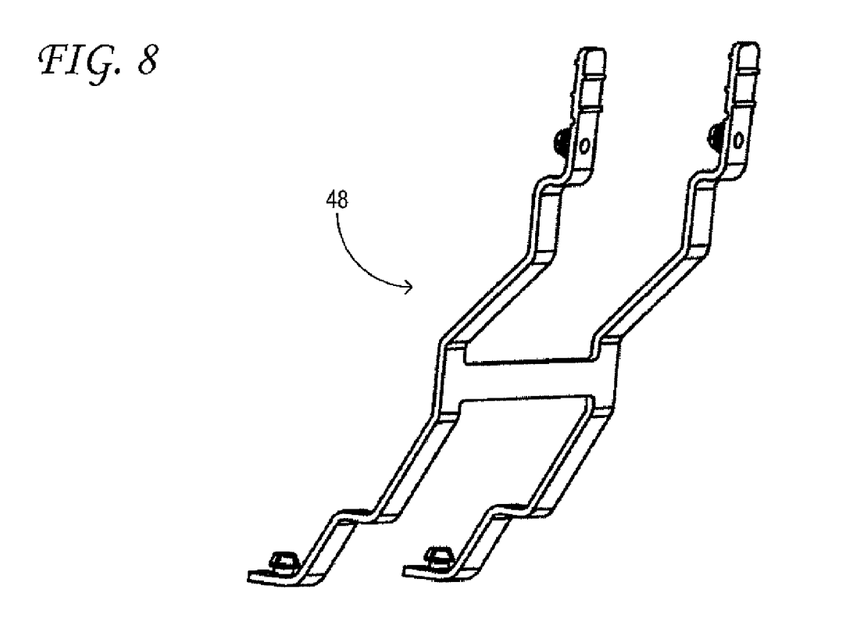
FIG. 8 shows a perspective view of a retaining band of a motor-vehicle air cleaner in accordance with an embodiment of the present disclosure.

FIG. 8 shows a perspective view of retaining band 48 in another embodiment. The dimensions the retaining band shown in FIG. 8 are based on a model of this embodiment and are drawn to scale.

Returning again to FIG. 1, housing body 32 may, in some embodiments, be heated in the vicinity of flow restrictor 44. Heating the housing body offers an advantage in scenarios where even the auxiliary filter may be subject to an accumulation of snow. Accordingly, heating the housing body may prevent at least the auxiliary filter from being clogged with snow, thereby providing adequate air flow to the engine. In one embodiment, the housing body may be heated electrically. However, numerous embodiments are contemplated wherein the housing body is heated via exhaust gas, either directly or indirectly. In the embodiment shown in FIG. 1, for example, the housing body is supplied heat via exhaust conduit 22, which may be adapted to run through or around the housing body. In other embodiments, the housing body may be supplied heat via a heat pipe or other heat exchanger configured to draw heat from the exhaust conduit. In embodiments where the air-cleaner housing is heated, the various constituents of the air cleaner, including the flow restrictor, may comprise a heat-resistant material.

In other embodiments, where air cleaner 20 is not actively heated, other measures may be taken to prevent or mitigate the accumulation of snow, especially in the vicinity of auxiliary filter 30. In the embodiment shown in FIG. 1, for example, housing body 32 has an elongated shape in the vicinity of flow restrictor 44. The elongated shape may encourage snow to slide off, rather than accumulate on, the air-cleaner housing.

Figure 9:
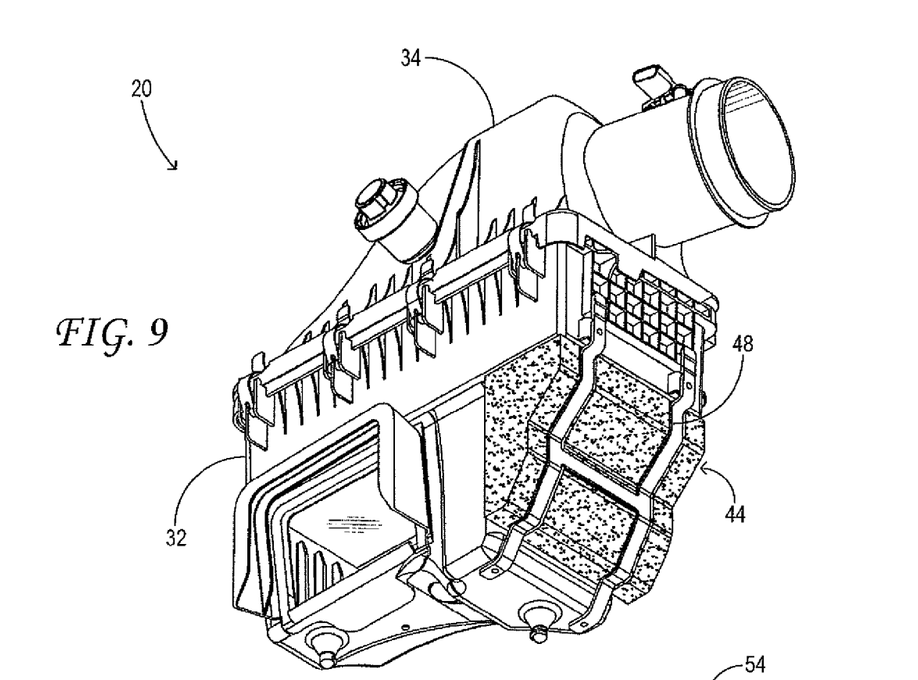
FIG. 9 shows a perspective view of a motor-vehicle air cleaner in accordance with an embodiment of the present disclosure.
Figure 10:
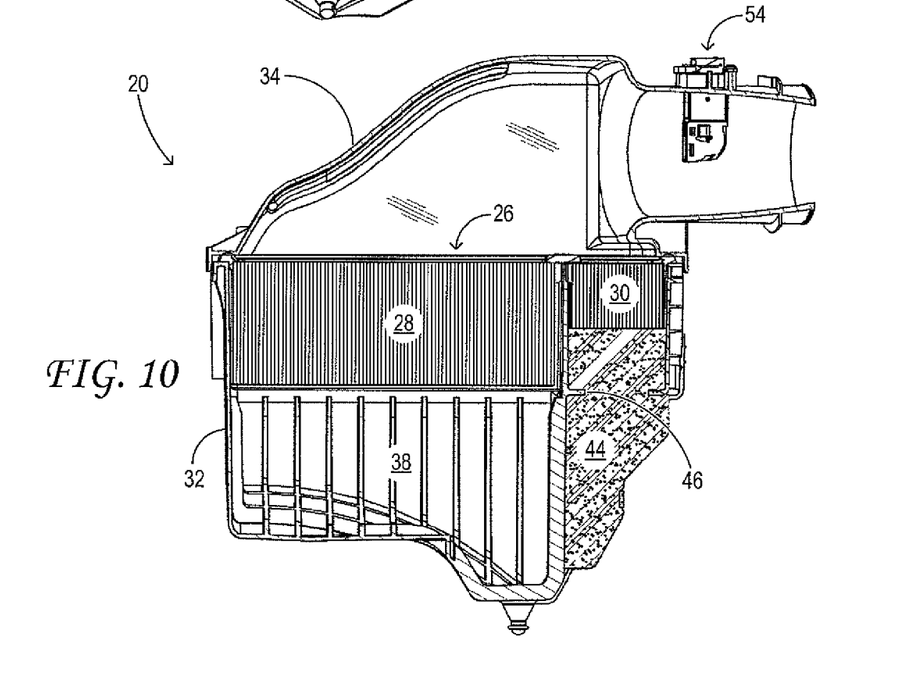
FIG. 10 shows a cross-sectional view of a motor-vehicle air cleaner in accordance with an embodiment of the present disclosure.

FIGS. 9 and 10 show, respectively, a perspective view and a cross-sectional view of air cleaner 20 in another embodiment. The dimensions of the air cleaner shown in these drawings are based on a model of the embodiment and are drawn to scale. The perspective view shows housing body 32, housing cover 34, flow restrictor 44, and retaining band 48. The cross-sectional view further shows filter mount 26, main filter 28, auxiliary filter 30, main compartment 38, and mass airflow sensor 54.

Figure 11:
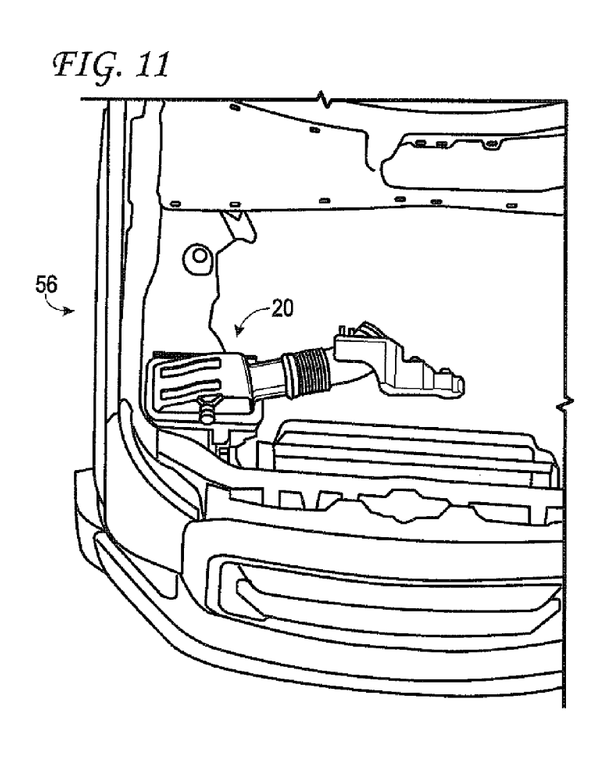
FIG. 11 shows an air-cleaner installed in an engine compartment of a motor vehicle in accordance with an embodiment of the present disclosure.
Figure 12:
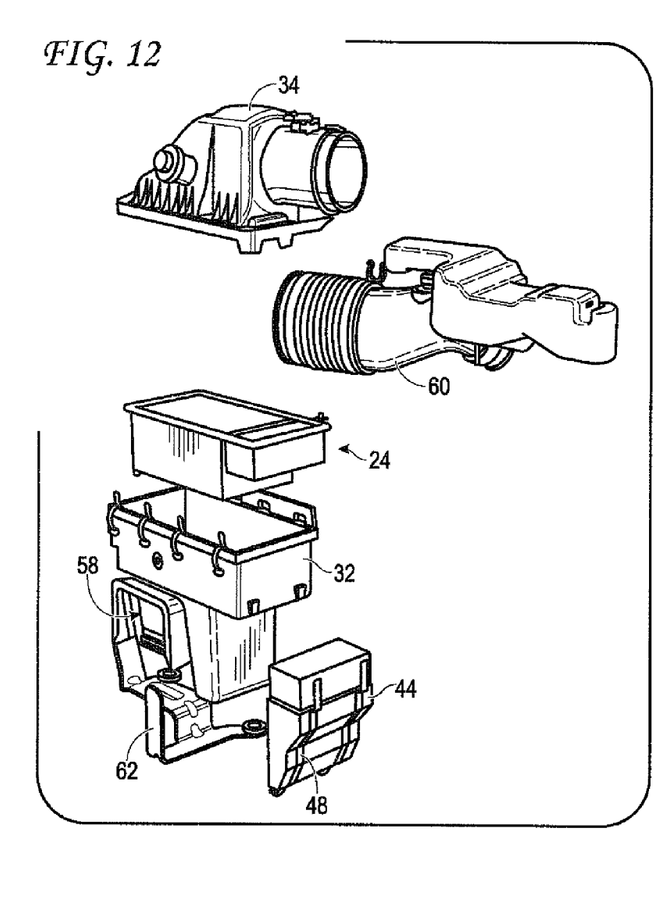
FIG. 12 shows an exploded view of the air-cleaner of FIG. 11 in accordance with an embodiment of the present disclosure.

FIG. 11 shows air-cleaner 20 installed in the engine compartment of a motor vehicle 56 from an above perspective. FIG. 12 shows an exploded view of the air cleaner, which includes filter assembly 24, housing body 32, housing cover 34, flow restrictor 44, and retaining band 48. FIG. 12 also shows air inlet 58, clean-air conduit 60, and bracket 62. The bracket may be any suitable bracket configured to at least partly secure the air cleaner within the engine compartment.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. An air cleaner configured to provide clean intake air for a motor vehicle, comprising:
    a filter assembly including a main filter, an auxiliary filter set apart from the main filter, and a filter mount fixed to and configured to support the main filter and the auxiliary filter;
    an air-cleaner housing configured to fittably and removably accommodate the filter assembly and to enclose the main filter and the auxiliary filter separately when the filter assembly is installed therein; and
    a flow restrictor configured to restrict air flow to the auxiliary filter and to allow sufficient air flow through the auxiliary filter to sustain combustion in an engine of the motor vehicle when the main filter is clogged.

2. The air cleaner of claim 1, where the air-cleaner housing comprises a housing body and a housing cover, and where the housing cover is sealably coupled to at least one of the housing body and the filter assembly, and configured to receive air flow from the main filter and the auxiliary filter.

3. The air cleaner of claim 2, where the housing body frames one or more open areas configured to admit ambient air, and includes ribbing for increased structural rigidity.

4. The air cleaner of claim 1, where the filter assembly comprises a first sealing element, and the air-cleaner housing comprises a second sealing element complementary to the first sealing element, and where the first and second sealing elements form a seal passing between the main filter and the auxiliary filter.

5. The air cleaner of claim 4, where the second sealing element is included in a housing body.

6. The air cleaner of claim 2, where the flow restrictor comprises a resilient material.

7. The air cleaner of claim 6, where the housing body comprises a flange framing an open region, the air cleaner further comprising one or more bands extending from one locus of the housing body to another locus of the housing body, and configured to further retain the resilient material in the open region.

8. The air cleaner of claim 2, where the housing body comprises a flange framing an open region configured to allow air to flow to the auxiliary filter, and where the flow restrictor is inserted into the open region and retained there by the flange.

9. The air cleaner of claim 8, where the flow restrictor includes a groove configured to receive the flange.

10. The air cleaner of claim 1, where the flow restrictor comprises foam.

11. The air cleaner of claim 10, where a porosity of the foam is between 40 and 100 pores per inch.

12. The air cleaner of claim 1, where the flow restrictor comprises an open-cell foam monolith.

13. The air cleaner of claim 1, where the flow restrictor is configured to restrict air flow to the auxiliary filter such that a great majority of intake air flowing through the air cleaner flows through the main filter in preference to the auxiliary filter when the main filter is substantially unclogged.

14. An air cleaner configured to provide clean intake air for a motor vehicle, comprising:
    a filter assembly including a main filter, an auxiliary filter set apart from the main filter, and a filter mount fixed to and configured to support the main filter and the auxiliary filter, and comprising a first sealing element passing between the main filter and the auxiliary filter;
    an air-cleaner housing including a second sealing element complementary to the first sealing element, the air-cleaner housing configured to fittably and removably accommodate the filter assembly and to enclose the main filter and the auxiliary filter separately when the filter assembly is installed therein; and
    a flow restrictor configured to restrict air flow to the auxiliary filter and to allow sufficient air flow through the auxiliary filter to sustain combustion in an engine of the motor vehicle when the main filter is clogged.

15. The filter assembly of claim 14, where the first sealing element is configured to receive the complementary second sealing element, forming a seal passing between the main filter and the auxiliary filter.

16. The filter assembly of claim 14, where the first sealing element extends from one edge of the filter mount to an opposite edge of the filter mount.

17. The filter assembly of claim 14, where the first sealing element extends across an entire width of the filter mount.

18. An air cleaner configured to provide clean intake air for a motor vehicle, comprising:
    a filter assembly including a main filter, an auxiliary filter set apart from the main filter, and a filter mount fixed to and configured to support the main filter and the auxiliary filter, and comprising a first groove passing between the main filter and the auxiliary filter;
    an air-cleaner housing configured to fittably and removably accommodate the filter assembly and to enclose the main filter and the auxiliary filter separately when the filter assembly is accommodated in the air-cleaner housing, the air-cleaner housing comprising a dividing wall sealably mating to the first groove, where receipt of the dividing wall in the first groove forms a substantially air-tight seal dividing the main filter from the auxiliary filter; and
    a foam monolith configured to restrict air flow to the auxiliary filter to allow sufficient air flow through the auxiliary filter to sustain combustion in an engine of the motor vehicle when the main filter is clogged.

19. The air cleaner of claim 18, where the air-cleaner housing comprises a flange framing an open region configured to allow air to flow to the auxiliary filter, where the foam monolith is inserted into the open region and retained there by a flange, and where the foam monolith includes a second groove configured to receive the flange.

* * * * *